Figure 1:
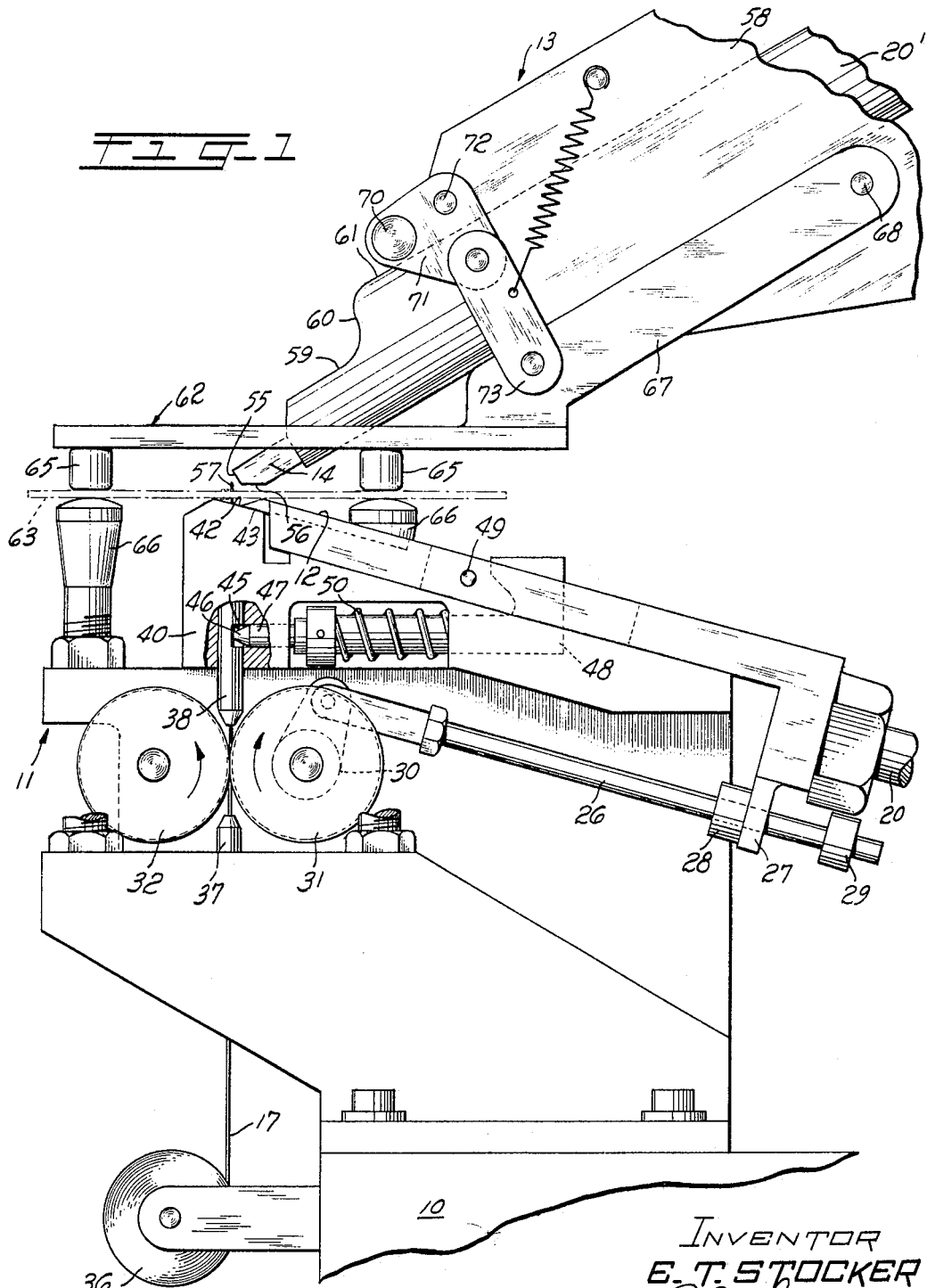

Dec. 6, 1966     E. T. STOCKER     3,289,909
APPARATUS FOR FORMING AND CLINCHING CONNECTORS
Filed April 16, 1965     6 Sheets-Sheet 1

INVENTOR
E. T. STOCKER
By J. J. Lipari
ATTORNEY

Dec. 6, 1966  E. T. STOCKER  3,289,909
APPARATUS FOR FORMING AND CLINCHING CONNECTORS
Filed April 16, 1965  6 Sheets-Sheet 2
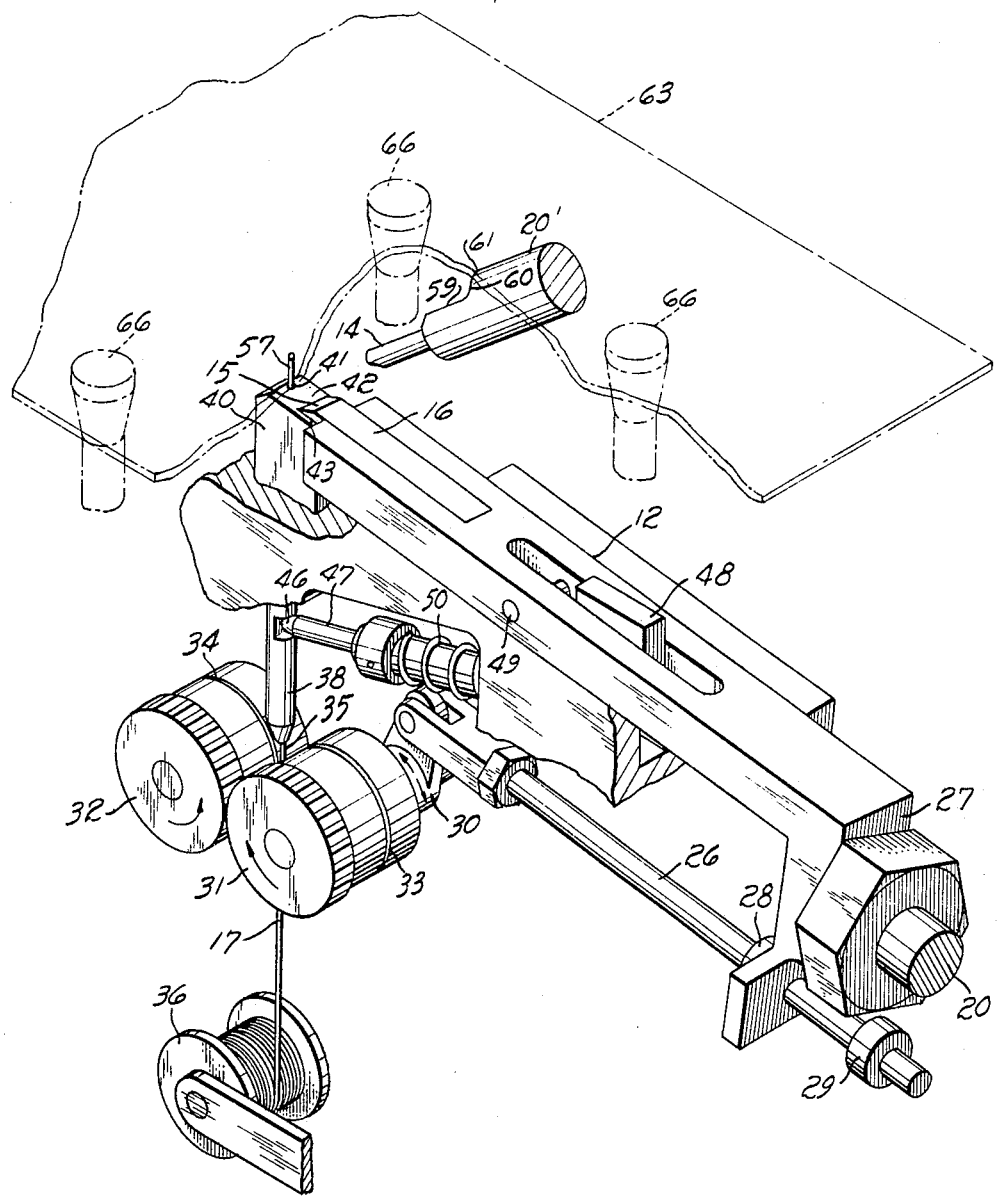

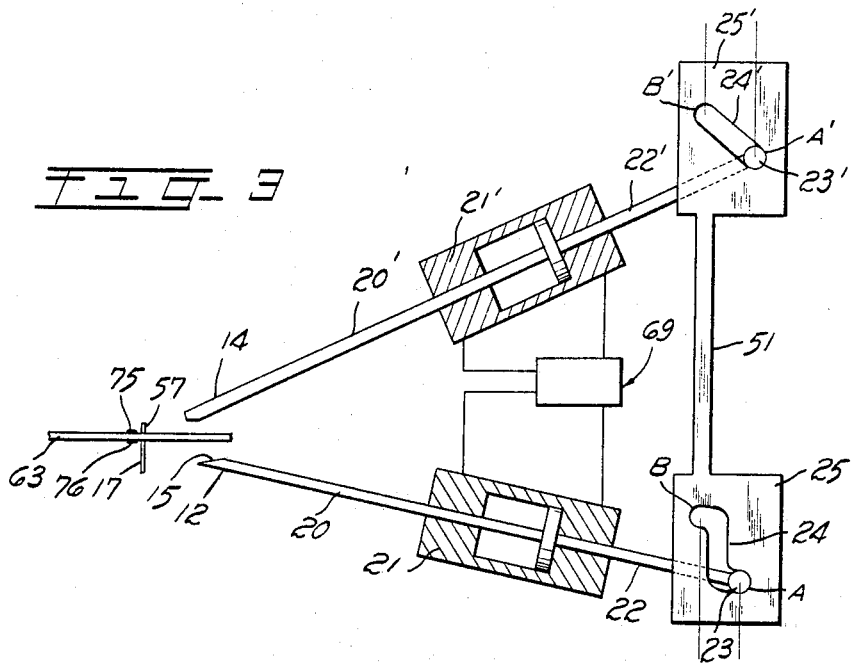
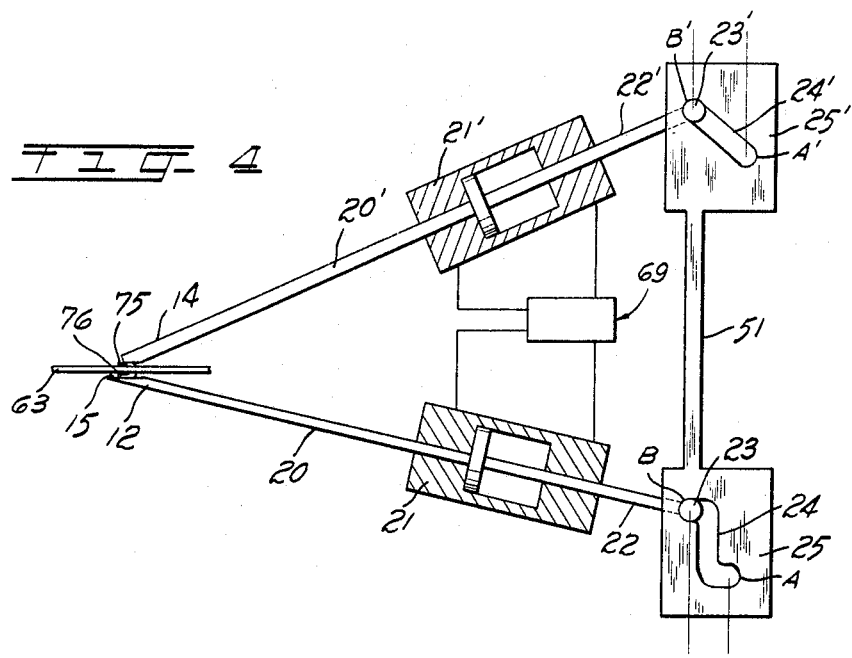

Dec. 6, 1966   E. T. STOCKER   3,289,909
APPARATUS FOR FORMING AND CLINCHING CONNECTORS
Filed April 16, 1965   6 Sheets-Sheet 4
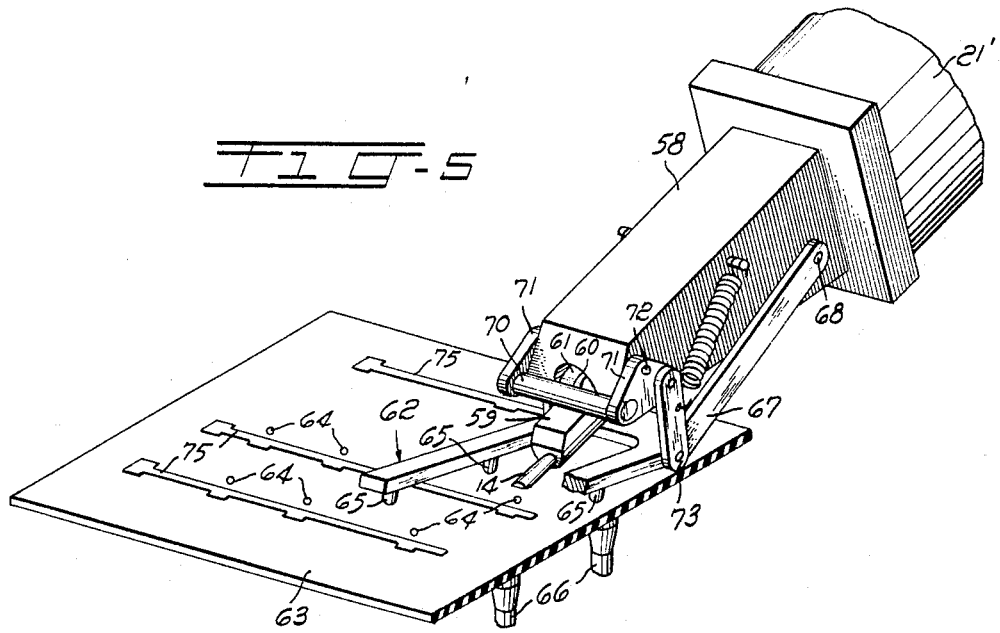
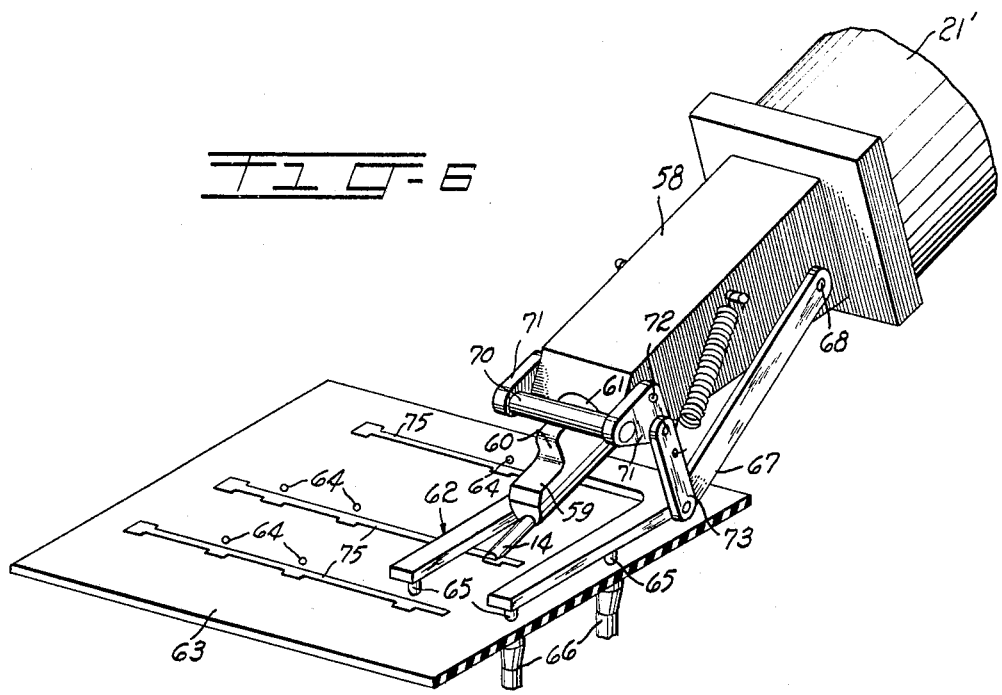

Dec. 6, 1966  E. T. STOCKER  3,289,909
APPARATUS FOR FORMING AND CLINCHING CONNECTORS
Filed April 16, 1965  6 Sheets-Sheet 5

Dec. 6, 1966 E. T. STOCKER 3,289,909
APPARATUS FOR FORMING AND CLINCHING CONNECTORS
Filed April 16, 1965 6 Sheets-Sheet 6

United States Patent Office 3,289,909
Patented Dec. 6, 1966

3,289,909
APPARATUS FOR FORMING AND CLINCHING CONNECTORS
Edward T. Stocker, Groveland, Mass., assignor to Western Electric Company, Incorporated, New York, N.Y., a corporation of New York
Filed Apr. 16, 1965, Ser. No. 448,817
9 Claims. (Cl. 227—80)

This invention relates to an apparatus for forming and clinching connectors to opposite sides of an article and particularly to an apparatus for forming and clinching connectors to preselected areas of circuitry on opposite sides of a circuit board.

In the manufacture of circuit boards having circuits on opposites thereof, electrical interconnections of the circuits are customarily effected through one or several holes extending through the board and terminating in preselected circuit areas, often referred to as land areas, by either a plated-through-hole or a resistance fused eyelet. With the use of plated-through-holes, the surface finish of the board opening is critical and several operations are required thereby resulting in relatively high costs. With resistance fused eyelets, a circular flange is formed in the head portion of the eyelet over the land area and is solder-connected thereto. However, due to the soldering of the entire flange of the eyelet to the land area, at times, when stresses were built up in the boards, e.g., due to thermal expansion, the solder connection would crack and thereby cause the circuit to open.

An improved type circuit board and method of fabricating same is disclosed in a copending application of Ernst Gutbier, entitled "Circuit Board and Method of Connecting Connectors Thereto," Serial No. 448,643, filed Apr. 16, 1965. That application shows the use of a clinched wire connector for interconnecting circuit areas on opposite sides of a circuit board. The present apparatus is provided for forming and clinching a wire connector to interconnect circuits on opposite sides of a circuit board.

One of the objects of this invention is to provide a new and improved apparatus for forming and clinching connectors to preselected areas of an article.

Another object of this invention is to provide a new and improved apparatus for forming and clinching connectors to preselected areas of circuitry located on opposite sides of a circuit board.

An apparatus, illustrating certain aspects of the invention, for forming and clinching connectors to preselected areas disposed on opposites sides of an article may include means for receiving the article and means for supplying a predetermined length of conducting strand material to the receiving means such that one end of the strand material extends beyond one side of the article. Means are provided for engaging and bending the said one end of strand material against a preselected area on one side of the article. Finally, means are provided for severing the strand material extending from the other side of the article, and bending the cut end thereof against a preselected area on said other side.

Figure 7:
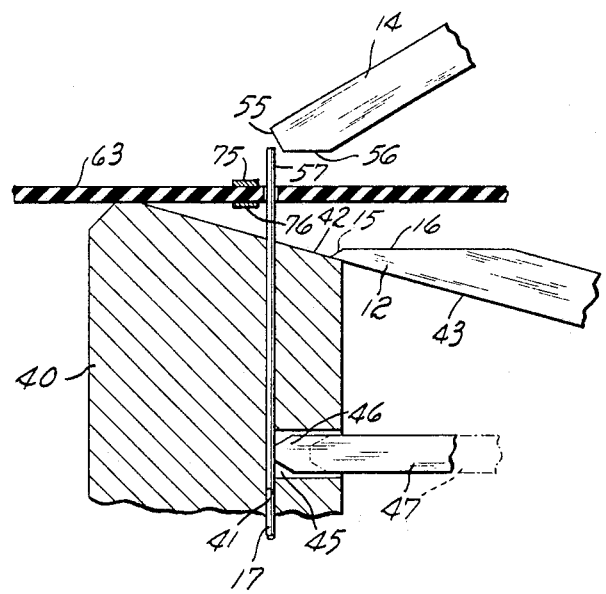
Figure 8:
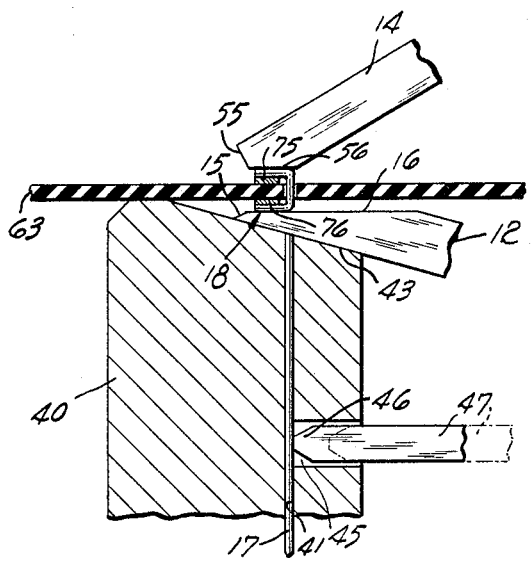
Figure 9:
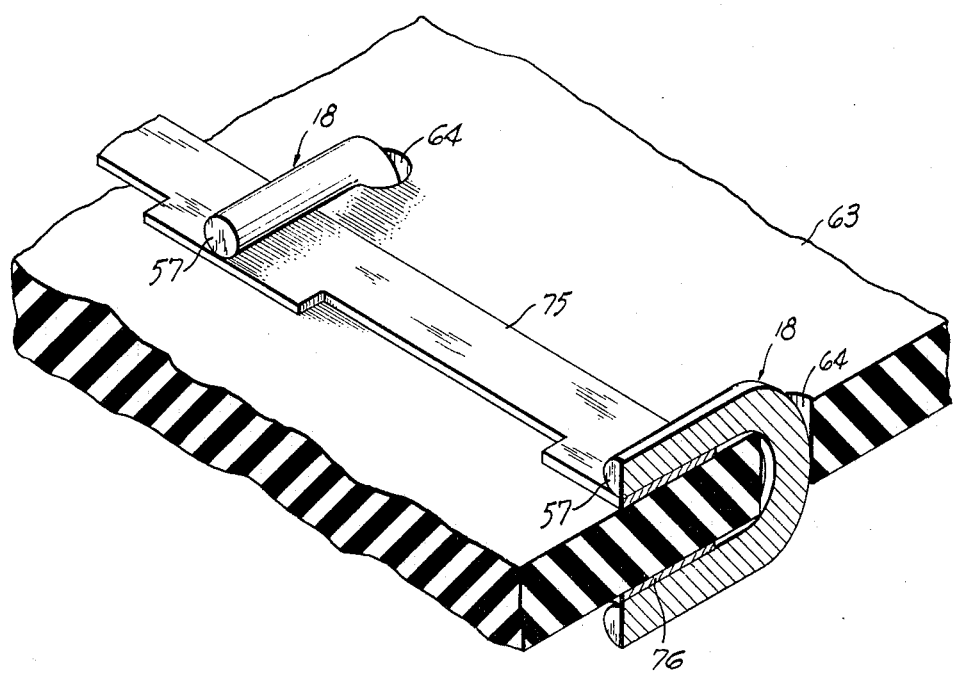

Other objects and advantages will be apparent from the following detailed description when considered in conjunction with the accompanying drawings, wherein:

FIG. 1 is a side elevational view of the apparatus;
FIG. 2 is an enlarged fragmentary view of the apparatus depicting the wire feeding and clamping means;
FIG. 3 is a schematic view depicting the respective drive means for the bending tool and the forming and cutting tool, when in their normally retracted positions, prior to forming a connector;
FIG. 4 is a schematic view depicting the respective drive means for the bending tool, and the forming and cutting tool, when in their extended positions, after forming a connector;
FIG. 5 is an enlarged fragmentary view depicting the bending tool in its normally retracted position and of the circuit board holder in its open position;
FIG. 6 is an enlarged fragmentary view depicting the bending tool in its extended position for partially forming the connector and of the circuit board holder in its closed position;
FIG. 7 is an enlarged fragmentary view depicting the bending tool, and the cutting and forming tool, prior to their forming and clinching of a connector to preselected circuit areas of a circuit board;
FIG. 8 is an enlarged fragmentary view depicting the bending tool, and the cutting and forming tool, after their forming and clinching of a connector to preselected circuit areas of a circuit board, and
FIG. 9 is an enlarged view of a circuit board illustrating clinched connectors.

With reference to the drawing, FIG. 1 depicts an apparatus having a frame 10 for supporting a lower unit 11 which includes a cutting and forming tool 12 and an upper unit 13 which includes a bending tool 14.

The cutting and forming tool 12 is provided with an angular cutting edge 15 (FIGS. 2, 7 and 8) and a substantially flat forming edge 16 contiguous therewith for respectively cutting a wire 17 and bending it to a desired position during the forming and clinching of a connector 18 (FIG. 8). The cutting and forming tool 12 is connected to and driven by a forward piston rod 20 (FIGS. 1, 2, 3 and 4) of an air cylinder 21 also having a rearward piston rod 22 provided with a cam follower 23 for travel within a formed slot 24 of a cam 25. A shaft 26 extends through an end portion 27 of the cutting and forming tool 12 and is provided with collars 28 and 29 located on either side of said end portion. The other end of the shaft 26 is connected to an indexing clutch 30 operable for controlling the rotation of a spur gear 31 in mesh with a spur gear 32. As seen in FIG. 2, the spur gears 31 and 32 have respective circumferential grooves 33 and 34 which form an opening 35 therebetween for snugly receiving the wire 17 from a supply reel 36.

Tubular guides 37 and 38 are axially aligned with opening 35 on either side thereof, guide 37 extending from frame 10 and guide 38 being connected to a die 40 such that it communicates with a passage 41 therein. The top surface 42 of die 40 is inclined at an angle in the same plane as the bottom surface 43 of the cutting and forming tool 12, as seen in FIGS. 2, 7 and 8. With such structure, the cutting of the wire 17 by cutting edge 15 and the bending thereof by the flat forming edge 16 is facilitated as described hereinafter. Die 40 is provided with a slot 45 disposed normal to its passage 41 for receiving a clamping end 46 of a clamp 47, the other end 48 of the clamp normally being held in engagement with a pin 49 extending from the cutting and forming tool 12 to hold the clamp in a retracted position (FIG. 2). The clamp 47 is provided with a spring 50 which tends to urge clamp end 46 through slot 45 to contact and hold the wire 17 during the forming and connecting of the connector 18 (FIGS 1, 7 and 8).

With respect to the upper unit 13, the bending tool 14 includes bevelled surfaces 55, 56 for respectively engaging and bending the end 57 (FIG. 7) of wire 17. The bending tool 14 is connected to and driven by a forward piston rod 20′ of an air cylinder 21′ also having a rearward piston rod 22′ provided with a cam follower 23′ for travel within a formed slot 24′ of a cam 25′ which is connected to cam 25 by member 51. As seen in FIGS. 1, 5 and 6, the forward piston rod 20′ extends through a housing 58 and is provided with a lower flat surface 59, a sloped surface 60 and a relatively higher flat surface 61 for controlling the movement of a toggle holder 62 by cam action for holding a manually inserted circuit board 63.

The holder 62 is substantially U-shaped and provided with a plurality of supporting legs 65—65 for engaging the top surface of circuit board 63 and clamping it against a plurality of supporting legs 66—66 extending upwardly from the lower unit 11. The holder 62 is provided with a pair of arms 67—67 pivotally mounted at 68—68 to the housing 58. A roller 70 is supported by end members 71—71 which are mounted at 72—72 to the housing 58, the end members being connected by spring-loaded links 73—73 to the arms 67—67, respectively.

In operation, the wire 17, for interconnecting a circuit 75 on the top surface of the circuit board 63 and a circuit 76 on the bottom surface of the circuit board, is threaded from the supply reel 36, through guide 37, the opening 35, the tubular guide 38 and through passage 41 in die 40 to a position such that the wire end 57 is located slightly above the die. The operator then places the circuit board 63 upon the supporting legs 66 so that the circuit board hole 64 through which the connector 18 is to be made overlies the wire end 57. Since an increment of wire had been fed upwardly during a preceding cycle, as discussed in detail hereinbelow, the wire end 57 extends through and slightly above hole 64 when the circuit board is placed on supporting legs 63 and the top of die 40. The operator depresses a foot pedal (not shown) which operates a conventional control unit, generally indicated at 69 to simultaneously energize air cylinders 21, 21'. As seen in FIGS. 5 and 6, respectively, during the initial phase of the forward stroke of piston rod 20', its arcuate surface 60 passes beneath roller 70 which causes the holder end members 71—71 to pivot in a clockwise direction and urge links 73—73 downwardly thereby resulting in the U-shaped holder 62 moving downwardly with its supporting legs 65 engaging and clamping the circuit board 63. Simultaneously, during the initial phase of the stroke of piston rod 20, the cutting and forming tool 12 moves forward from collar 29 to collar 28 thereby causing pin 49 to move from clamp end 48 and release tension on spring 50 to enable clamp 47 to advance until its clamping end 46 engages and clamps the wire 17.

As seen in FIGS. 7 and 8, after the board 63 and the wire 17 are clamped, further advance of forward piston rod 20' to complete its stroke results in the bevelled surfaces 55 and 56 of bending tool 14 to bend and clinch the wire end 57 firmly against the circuit 75. During this phase of the stroke of forward piston rod 20', rearward piston rod 22' also advances thereby moving cam follower 23' along slot 24' of cam 25' from position A' to position B', which, in turn, moves cam 25' downwardly. As a result, cam 25 is moved downwardly by member 51 thereby permitting cam follower 23 on rearward piston rod 22 of air cylinder 21 to move forward from position A' to B'. Accordingly, the cutting and forming tool 12 advances at an angle so that the cutting edge 15 cuts the wire 17 and continued advance of the tool results in its forming edge 16 bending and wiping the wire firmly against circuit 76. Thus, at the end of the forward stroke of forward piston rods 20, 20', a portion of the wire 17 has been severed, formed into a connector 18 and interconnected to circuits 75 and 76 (FIGS. 8 and 9).

During the return stroke of forward piston rod 20', the U-shaped holder 62 releases from board 63 and the bending tool 14 retracts to its normal position. Simultaneously, the return stroke of forward piston rod 20 causes the cutting and forming tool 12 to retract to its normal position. During this movement, when the cutting and forming tool 12 moves from collar 28 to collar 29, to feed the wire, pin 49 engages and moves clamp 47 to the right so that its clamping end 46 is withdrawn from the wire 17. When collar 29 is contacted, further movement of the cutting and forming tool to the end of its return stroke causes shaft 26 to move to the right which, in turn, results in clutch 30 engaging spur gear 31 and rotating it in a clockwise direction. Rotation of the spur gears 31 and 32 advance a predetermined length of wire 17 upwardly through die 40, and the apparatus is ready for another cycle.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. Apparatus for forming and clinching connectors to preselected areas disposed on opposite sides of an article, which comprises:
   means for supporting an article,
   means for supplying a predetermined length of conducting strand material to the article supporting means such that one end of the strand material extends beyond one side of the article,
   means operable for engaging and bending said one end of the strand material against a preselected area on said one side of the article,
   means for severing the strand material extending from the other side of the article and bending the cut end of said severed strand material against a preselected area on said other side so as to form a connector which interconnects the preselected areas, and
   means connected to the severing means for clamping the strand of material during the severing and bending thereof, the clamping of the wire taking place at a point remote from the article supporting means.

2. Apparatus for forming and clinching connectors to preselected areas of circuitry disposed on opposite sides of a circuit board having at least one opening extending therethrough which comprises:
   means for supporting the circuit board,
   means operable to intermittently supply a predetermined length of wire to the circuit board supporting means for passage through the circuit board opening such that one end of the wire extends beyond one side thereof,
   means operable to clamp the wire at a point thereon remote from the circuit board supporting means,
   means operable for clamping the circuit board against said supporting means,
   a bending tool operable for bending said one wire end firmly against an area of circuitry on the said one side of the circuit board,
   first drive means for controlling the movement of the board clamping means and bending tool,
   a cutting and forming tool operable for successively severing the wire and bending the cut end thereof firmly against an area of circuitry on the other side of the circuit board, while the bending tool is in engagement with the bent one end of the wire, so as to form a connector which connects said latter circuitry area with the former circuitry area, and
   second drive means cooperatively associated with said first drive means for controlling the movement of the wire supplying means, wire clamping means, and cutting and forming tool.

3. Apparatus for forming and clinching connectors to preselected areas of circuitry disposed on opposite sides of a circuit board having at least one opening extending therethrough, which comprises:
   means for supporting a circuit board including a die having a passage extending therethrough and a slot extending substantially normal to and communicating with said passage,
   means operable to intermittently supply a predetermined length of wire through the die passage to a position whereat one end of the wire extends beyond one side of the opening, means operable for clamping the circuit board against said supporting means, a bending tool having a bevelled surface and operable for bending said one end of the wire firmly against an area of circuitry on said one side of the circuit board, first drive means for controlling the movement of both the board clamping means and bending tool, a cutting and forming tool operable to successively sever the wire and bend the cut end thereof firmly against an area of circuitry on the other side of the circuit board so as to form a connector which connects said latter circuitry area with the former circuitry area, a wire clamping member operable to move through said die slot to engage and clamp the wire in a secured position during the forming of the connector, and second drive means cooperatively associated with said first drive means for controlling the movement of the wire supplying means, the cutting and forming tool, and the wire clamping member.

4. Apparatus for forming and clinching connectors to preselected areas of circuitry disposed on opposite sides of a circuit board having at least one hole extending therethrough, which comprises:

means for supporting a circuit board including a die having a passage extending therethrough and a slot extending substantially normal to and communicating with said passage, a pair of meshing gears each having a circumferential groove forming an opening therebetween for feeding a predetermined length of wire through the die passage to a position whereat one end of the wire extends beyond one side of the circuit hole, a clamping member mounted in said die slot and movable therein from a first position, where it is spaced from the wire in the die passage, to a second position where it engages and clamps the wire in a secured position, holding means movable from a first position, where it is spaced from the circuit board, to a second position where it engages the circuit board, urging it against the circuit board supporting means to securely hold the circuit board in place, a bending tool operable to bend said one end of the wire firmly against an area of circuitry on said one side of the circuit board, first drive means for controlling the movement of both the holding means and bending tool, a cutting and forming tool operable to successively sever the wire and bend the cut end thereof firmly against an area of circuitry on the other side of the circuit board while the bending tool is in engagement with the bent one end of the wire, so as to form a connector which connects said latter circuitry area with the former circuitry area, a clutch cooperatively associated with at least one gear, and second drive means cooperatively associated with said first drive means, said second drive means moving the clamping member from its first position to its second position and operating the cutting and bending tool during one portion of its cycle, and successively removing the cutting and forming tool from the connector, withdrawing the clamping member to its first position and activating the gears to feed another predetermined length of wire during another portion of its cycle.

5. An apparatus according to claim 4 wherein the second drive means includes:

a drive rod connected to said clutch, and first and second stop members affixed to the drive rod, said first stop member being contacted during said one portion of the cycle of the second drive means for disengaging the clutch from the feed gear and said second stop member being contacted during said other portion of the cycle of the second drive means, after removal of the cutting and forming tool from the formed connector and the clamping member from the wire, for engaging the clutch to rotate the feed gears to advance a predetermined length of wire.

6. An apparatus according to claim 3 in which the clamping member includes an end portion, and the second drive means includes a projecting element in the path of said end portion, said clamping end portion being released from the projecting element to cause the clamping member to move to its second position to clamp the wire during the said one portion of the cycle of the second drive means and being engaged by the projecting element to cause the clamping member to retract to its first position and thereby unclamp said wire during the said other portion of the cycle of the second drive means.

7. In apparatus for forming and clinching connectors to preselected areas of circuitry disposed on opposite sides of a circuit board, a mechanism for controlling the movement of a bending tool for bending one end of a wire against one preselected area of circuitry and a cutting and forming tool for cutting the wire and forming it against the other preselected area on the opposite side of the circuit board which comprises:

first and second fluid operated cylinders angularly disposed with respect to each other and each having a forward and rearward piston means, said forward piston means of the first cylinder being connected to the bending tool and said forward piston means of the second cylinder being connected to the cutting and forming tool, means for energizing the first and second piston means for advancing the bending tool to bend said one end of the wire against the one preselected area and for extending the forming and cutting tool, and means responsive to the advancing of the bending tool for moving the cutting and forming tool towards the bending tool, while the bending tool is in engagement with the bent said one wire end, for cutting the wire and forming it against the other preselected area.

8. In apparatus for forming and clinching connectors to preselected areas of circuitry disposed on opposite sides of a circuit board, a mechanism for controlling the movement of a bending tool for bending one end of a wire against one preselected area of circuitry and a cutting and forming tool for cutting the wire and forming it against another preselected area of circuitry on the opposite side of the circuit board, which comprises:

first and second fluid operated cylinders angularly disposed with respect to each other and each having a piston with a forward and rearward piston rod, said forward piston rod of the first cylinder being connected to the bending tool and said forward piston rod of the second cylinder being connected to the cutting and forming tool, first moving means connected to the rearward piston rod of the first cylinder, second moving means connected to the rearward piston rod of the second cylinder and operable by the first moving means, and means for energizing the first and second pistons for advancing the bending tool to bend said one end of the wire against the one preselected area and for extending the forming and cutting tool, said forming and cutting tool advancing from its extended position in response to the movement of the first and second moving means towards the bending tool, while the bending tool is in engagement with the bent one end of the wire, to cut the wire and form it against the other preselected area.

9. Apparatus for forming and clinching connectors according to claim 1, wherein:
   the article supporting means comprises a die having a passage for the conducting strand material extending therethrough and a slot therein communicating with said passage, and
   said clamping means is mounted in said slot and movable from a first position where it is spaced from said strand to a second position where it engages said strand and clamps it securely in position.

References Cited by the Examiner

UNITED STATES PATENTS

| | | | |
|---|---|---|---|
| 215,505 | 5/1879 | Carr et al. | 227—80 |
| 2,171,388 | 8/1939 | Berger | 227—80 X |
| 3,034,382 | 5/1962 | Hazel. | |

GRANVILLE Y. CUSTER, JR, *Primary Examiner.*